US008689665B2

(12) United States Patent
Winkler

(10) Patent No.: US 8,689,665 B2
(45) Date of Patent: Apr. 8, 2014

(54) EMERGENCY BRAKING SYSTEM FOR MACHINE TOOLS

(75) Inventor: Thomas Winkler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 692 days.

(21) Appl. No.: 12/806,140

(22) Filed: Aug. 6, 2010

(65) Prior Publication Data

US 2011/0048197 A1 Mar. 3, 2011

(30) Foreign Application Priority Data

Sep. 2, 2009 (DE) .......................... 10 2009 029 090

(51) Int. Cl.
*F16D 49/00* (2006.01)
(52) U.S. Cl.
USPC ... 83/58; 83/DIG. 1; 188/1.11 E; 188/1.11 L; 192/129 A
(58) Field of Classification Search
USPC ..................... 83/58, DIG. 1; 192/129 A, 144; 188/1.11 E, 1.11 I, 1.11 W
See application file for complete search history.

(56) References Cited

U.S. PATENT DOCUMENTS

| 2,047,556 | A | * | 7/1936 | Harvey | 188/335 |
| 2,151,151 | A | * | 3/1939 | Perez | 475/258 |
| 2,451,373 | A | * | 10/1948 | Beall | 49/138 |
| 3,032,146 | A | * | 5/1962 | Cortelli et al. | 188/171 |
| 4,258,832 | A | | 3/1981 | Thorp | |
| 5,366,280 | A | * | 11/1994 | Littlejohn | 303/3 |
| 7,990,663 | B2 | * | 8/2011 | Ziegler et al. | 361/42 |

FOREIGN PATENT DOCUMENTS

| DE | 2 207 244 | 8/1972 |
| DE | 26 32 304 | 2/1977 |
| DE | 195 36 995 | 4/1997 |
| GB | 1 351 545 | 5/1974 |
| GB | 1 536 595 | 12/1978 |
| WO | WO 03/100282 | 12/2003 |

* cited by examiner

*Primary Examiner* — Kenneth E. Peterson
*Assistant Examiner* — Jennifer Swinney
(74) *Attorney, Agent, or Firm* — Kenyon & Kenyon LLP

(57) ABSTRACT

An emergency braking system for a machine tool for abruptly braking a revolving shaft includes at least one brake drum and at least one brake shoe which are engaged with one another in order to brake the shaft. The braking intervention between the brake drum and the brake shoe takes place under the influence of a centrifugal force resulting from the rotation of a shaft as soon as a locking device is released. Also provided in the braking system is a diagnostic system which allows the functionality of the locking device to be checked.

5 Claims, 7 Drawing Sheets

EMERGENCY BRAKING SYSTEM FOR MACHINE TOOLS

BACKGROUND OF THE INVENTION

1. Field of the Invention

The present invention relates to a protective system, in particular an emergency braking system for a machine tool, e.g., a circular saw, which develops its protective effect within a very short time period which is generally in the range of several milliseconds (typically 1 to 50 ms) in order to protect a user of the machine tool from injuries in hazardous situations.

2. Description of Related Art

At the present time there are essentially three different approaches for implementing such a protective system for table and format circular saws, which are intended to prevent a user from coming into contact with the revolving saw blade or incurring a serious cut injury.

The protective system of a U.S. manufacturer, provided and marketed under the company name SawStop Inc., is an emergency braking system which allows the machine tool to be braked as the result of a direct intervention in the saw blade by a braking actuator system as soon as an appropriately designed sensor has detected a hazardous situation. Using a hot-wire triggering device, a rotatably mounted aluminum block is pushed into the toothing of the running saw blade with the aid of a pretensioned spring, the aluminum block becoming wedged therein and thus absorbing the rotational energy of all geometries of the machine tool which are revolving during the sawing operation. As a side effect, this one-sided application of force on the cutting tool is used to lower the saw blade into the saw table, using a specially designed suspension situated on the saw table. With the aid of this system it is possible to avert serious bodily injuries to the operator of the machine tool who triggers the protective mechanism. A disadvantage is the direct action on the machining tool, i.e., on the cutting geometry of the saw blade, since additional hazard potential for the operator results when parts of the toothing break off. Furthermore, restoring the operability of the protective system requires replacement of the brake unit, including the saw blade, with a replacement unit which is ready for use, and which the operator must have in stock in order to allow continued operation after a braking operation has taken place using the protective function. This entails significant consequential costs and a corresponding time expenditure for the procurement and installation. In addition, it may be assumed that all components affected by the braking operation, i.e., all revolving geometries of the machine tool, are subjected to severe stresses during the deceleration phase. Neither the manufacturer nor applicable publications pertaining to this system provide data concerning the fatigue strength of the unit.

Another approach involves the use of a protective system exclusively for lowering the saw blade into the saw table without initiating a braking operation of the saw blade. With the aid of a pyrotechnic ignition charge, the saw blade including the main shaft and its bearing are removed from the hazard zone, thus allowing severe injury to the operator to be prevented. A disadvantage of this type of protective system is the necessity of moving relatively large masses, in the form of the systems to be lowered, under severe time constraints in the millisecond range. The pyrotechnic ignition devices necessary for this purpose, which have proven to be indispensable for this protective actuator system, also result in costly partial reversibility, which limits immediate resumption of operations of the machine tool including a protective system which is ready for use, and also imposes time-related and organizational constraints. In addition, due to space limitations and a very specific operating procedure, this protective system is suitable only for fairly large stationary equipment, for example circular table saws, which allow such a design in their interior. In contrast, this system is ruled out for use on smaller hand-operated devices such as compound miter saws and miter saws, for example.

A disclosure from a publicly funded project named "CutStop" (VDI/VDE/IT) regarding a protective system for format circular saws from the Institut für Werkzeugmaschinen (IFW) [Institute for Machine Tools], University of Stuttgart, describes an approach which, using a special shape of a disk brake system, namely, a self-amplifying wedge brake, brings the main shaft of the machine tool, and thus the saw blade, to a standstill. With the aid of a pyrotechnic ignition device, a wedge is accelerated and subsequently pushed between a stationary wedge guide, in the form of a modified brake caliper, and the rotating brake disk. The system acts in a self-locking manner for the selection and combination of specific wedge angles $\alpha$ and brake lining values $\mu$, so that, using this design, the particular time demands on the braking operation may be met as a function of the mass inertia to be decelerated. However, as described in the cited publication, the disadvantage of this protective system is that subsequent to the triggering of the protective actuator system it is necessary to replace the complete brake unit due to the wedge which gets jammed in the friction pairing. The time required for carrying out this operation is approximately 10-12 minutes for complete restoration of system operability. Thus, here as well, there is partial limitation of the immediate system reversibility.

A safety brake for elevators is known from published German patent document DE 195 36 995 A1, which has a unit which brakes and optionally stops the drive via speed-dependent deceleration when a predetermined maximum speed of the transport means is exceeded. The safety brake of published German patent document DE 195 36 995 A1 acts, as a function of the rotational speed, directly on the drive pulley of the cable-driven transport unit, and is able to limit the rotational speed thereof. The safety brake, which is designed as a centrifugal force brake, also has a device for boosting the braking force as a function of the conveying speed.

BRIEF SUMMARY OF THE INVENTION

It is an object of the present invention to provide a protective system of a machine tool, in particular a reversible protective system, having a design which reliably triggers and develops its protective effect within a few milliseconds.

To achieve this object, the present invention provides an emergency braking system for abruptly braking a revolving shaft of a machine tool, the emergency braking system having a brake drum and at least one brake shoe which are engaged with one another in order to brake the shaft. The brake drum and the at least one brake shoe are secured in a first state with the aid of a locking device. When a hazardous situation is detected, the locking device of the braking system is released, i.e., deactivated, via an appropriate signal, so that the braking intervention between the brake drum and the brake shoe may take place under the influence of the centrifugal force or centrifugal acceleration resulting from the rotation of the shaft.

A locking device may be moved between a locked position, in which the brake shoe is held against the brake shoe carrier, and an unlocked position in which the at least one brake shoe is released in such a way that it undergoes a swivel motion toward the brake drum in order to bring about the braking intervention. In other words, the at least one brake shoe which rotates with the revolving shaft is abruptly moved toward the stationary brake drum within a few milliseconds, making use of the centrifugal force of the revolving shaft, as soon as the locking device is transferred to its unlocked position.

According to the present invention, a diagnostic system is present which checks the functionality of the locking device and in particular its ability to release the brake shoes. The functions for diagnosing the system state of the braking system may be carried out, for example, with the aid of an electronics system, specifically provided for this purpose, in a diagnostic circuit. Depending on the result of the diagnosis, the machine tool may then be enabled, or also blocked, for example.

For technical reasons, in particular to achieve the fastest possible triggering times in the range of a few milliseconds, the electromagnetic actuator which is necessary for triggering the braking event should advantageously be operated as an attracting magnet. It is thus possible, via an anchor plate, to very quickly pull the locking pins of the brake shoes from the brake shoes when the actuator is activated, thus releasing the brake shoes.

The fact that the actuator is designed as an attracting magnet also means that in the event of a hazard the magnet must be electrically actuated in order to attract the anchor plate and thus trigger the system. To reliably ensure the protective function of the emergency braking system, information is therefore necessary concerning whether the actuator, the control lines, as well as the entire braking system are in the operationally ready state in order to be able to properly respond to an appropriate triggering signal.

The present invention is directed to monitoring the braking system, before the machine tool is switched on as well as during operation of the machine tool, at predetermined intervals on the basis of specific criteria, with the aid of a diagnostic system, and to deduce the system state thereof using stored characteristic data. Deducible measures may be carried out in the form of prohibiting the machine tool from being switched on, initiating emergency braking triggered by the system, fading in of messages on a display, or the like.

In the braking device according to the present invention, it is advantageous that only a locking or unlocking force needs to be applied for actuating the brake, since the force necessary for the braking power is generated by centrifugal forces of the system.

Because the locking or unlocking force is much lower than the required braking forces, locking may also be deactivated, i.e., released, very quickly. Together with a short braking time, this results in a very short time in the millisecond range (which is typically in the range of 1 to 50 ms, advantageously in the range of 1 to 20 ms, and in particular in the range of 10 ms or less), in which the braking system is able to brake the tool of a machine tool.

The locking device preferably includes at least one blocking element which may be moved between a locked position, in which it is engaged with the at least one brake shoe, and an unlocked position in which it is decoupled from the brake shoe. Such a blocking element may be designed, for example, as locking pins or the like.

The locking device advantageously includes an actuator which transfers the locking device from the locked position to the unlocked position. This actuator may, for example, be a magnetic actuator which attracts a ring armature to which a blocking element in the form of a locking pin is fastened in order to disengage the locking pins from the brake shoe so that the brake shoe is released.

The present invention is directed to regularly checking the two essential components of the locking device in order to ensure that the locking device would also reliably function in the event of braking. For this purpose, the functionality of the actuator of the locking system as well as the position of the locking pins of the locking device are checked by the diagnostic means.

The present actuator is designed to function in interaction with an anchor, preferably as an anchor plate, which is attracted at the time of the triggering. The resulting action of force on the plate on all sides allows a uniform pull without lateral forces, thus preventing possible tilting of the anchor plate. In addition, the passage of current through the actuator and the resulting attraction of the anchor allow very short response times of the system.

The state of a magnetic actuator which triggers the braking system of the machine tool with the aid of a given signal of a sensor system may be checked, for example before the machine starts operation. Based on the signal response, the presence and the state of all relevant contacts of the system may be deduced.

If the diagnostic system recognizes that the actuator is functional, a start signal for enabling the motor operation may be output.

For diagnostic purposes, the actuator is acted on by a diagnostic current which is less than the current which is needed in the event of triggering. When the actuator is acted on by the diagnostic current the anchor is not attracted; however, the state of the actuator may be deduced from measured characteristic data of the diagnostic current sent by the actuator, such as the current intensity, the voltage, or also the variation of these variables over time, for example.

With the aid of a diagnostic circuit which is able to record and evaluate an analog variable in the range of a few milliseconds, even the signal variation over time, for example in the form of an increase in current, may be used to deduce the state of the actuator, for example the winding thereof, by comparing the obtained measured data to setpoint data stored in the diagnostic system.

A characteristic curve, in particular a characteristic curve of the diagnostic current sent by the actuator, may thus be advantageously measured and evaluated.

Using the advantageous system of the braking system and the actuator, it is also possible to attract a revolving anchor of the electromagnetic actuator with the aid of a magnet, in particular an electromagnet, affixed to the housing, thus greatly simplifying the control of the actuator. For this purpose, the stroke of the anchor plate must be properly limited by stops in order to prevent abrasion of the co-rotating anchor plate against the stationary magnet.

Due to the design of the braking system and in particular of the locking device of the braking system, the position of the anchor plate is a direct indication of system states, and is therefore to be evaluated as a key point of a system diagnosis.

With the aid of a specialized sensor, at any time in the system check, information concerning the position of this anchor plate may be forwarded to the system and evaluated in order to deduce appropriate measures for the future operation of the equipment.

It is also possible to deduce the distance of the anchor plate from the magnet by determining and evaluating the magnetic field (diagnostic magnetic field) which during the diagnosis develops in the magnetic circuit of the actuator due to the diagnostic current. This may optionally be achieved using auxiliary electric variables, thus dispensing with an additional sensor for recognizing the position of the anchor plate. The inductance of the coil, which is a function of the position of the anchor plate, may be used as such an auxiliary variable. The position and in particular the distance of the anchor plate from the attracting coil may be deduced by measuring the inductance of the coil with the aid of a diagnostic current of the diagnostic device. Since the locking pins of the locking device are provided at the anchor plate, it may thus be determined whether the locking pins are in their intended position, and whether they may be correctly extracted in the event of triggering.

The diagnostic system, with the aid of the diagnostic current, thus allows the functionality of the actuator as well as the correct orientation of the locking pins of the locking system to be checked.

The diagnostic functions of the diagnostic system may also be carried out at predefined intervals, for example once per minute, during operation of the equipment in order to obtain information concerning possible changes in the protective system during regular operation of the machine. It is reasonable for the diagnostic system to also be activated every time the machine tool is switched on. First, a diagnosis of the emergency braking system of the device is then carried out, and, depending on the result, the diagnostic system enables or does not enable the machine tool. In the event of enablement, for example, the motor of the machine tool may be activated. If the diagnostic system detects an irregularity, i.e., in particular a deviation of the measured parameters from the stored setpoint variables, the machine tool is not started, and a user is informed of the presence of a potential problem.

Moreover, the present invention relates to a machine tool having an emergency braking system, in particular a diagnostic system of the type previously described, whereby the machine tool may preferably be a saw, in particular a circular saw, more precisely a circular table saw, a compound miter saw, or a miter saw.

However, it should be self-evident that the diagnostic system according to the present invention may also be applied to other machine tools which in a specific event rely on a deceleration which may be triggered in a targeted manner within a given time period in the range of a few milliseconds. The present invention may be adapted to a different machine tool in the individual case.

DETAILED DESCRIPTION OF THE INVENTION

Figure 7:
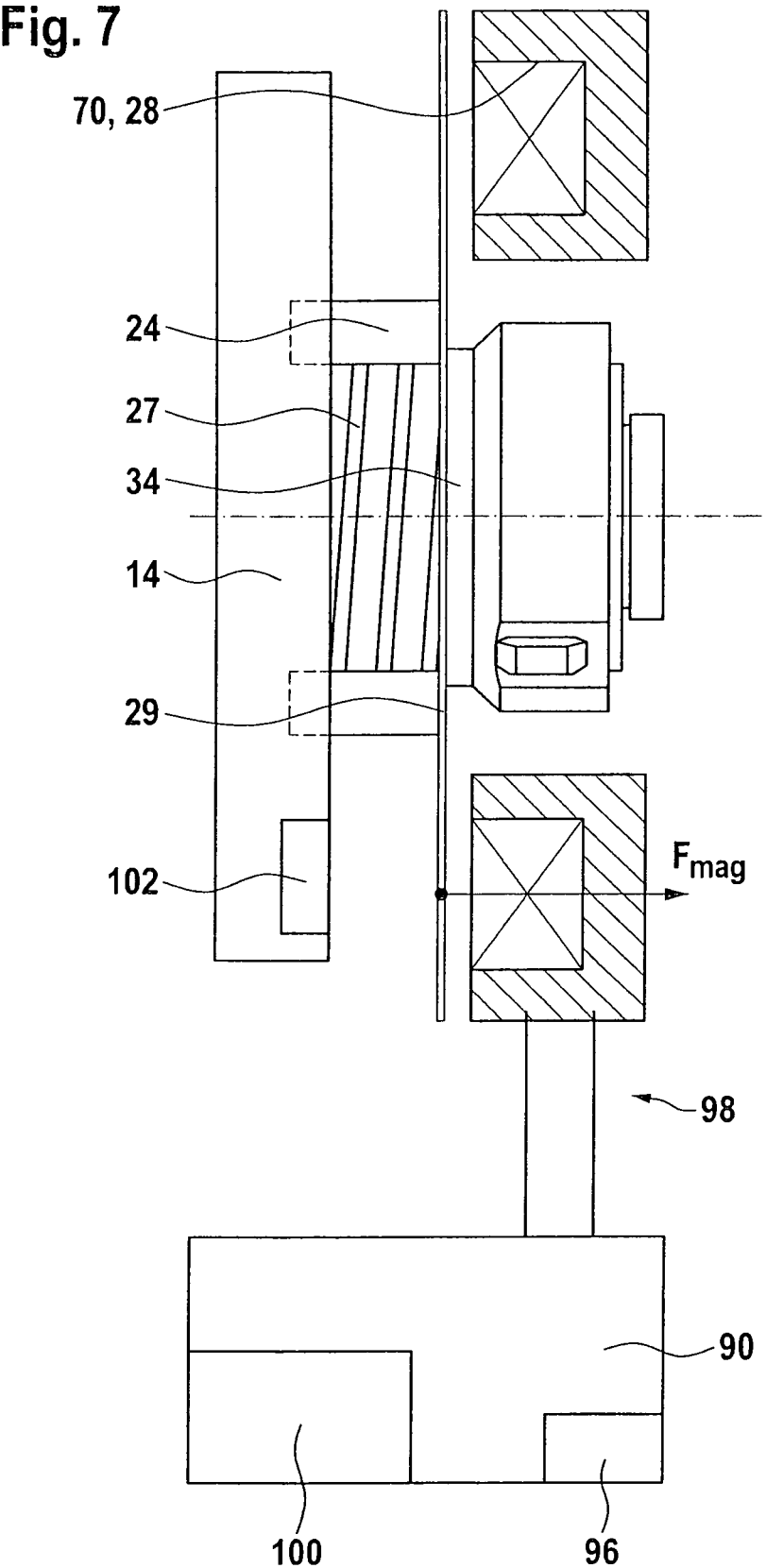
FIG. 7 shows a schematic illustration of the actuator of the braking system according to the present invention in interaction with the diagnostic system.
Figure 8:
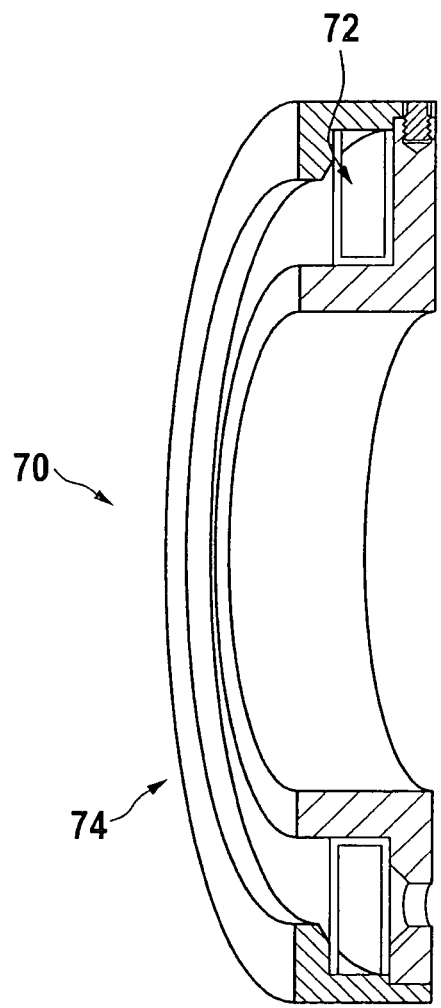
FIG. 8 shows a sectional illustration of the magnetic actuator.
Figure 9:
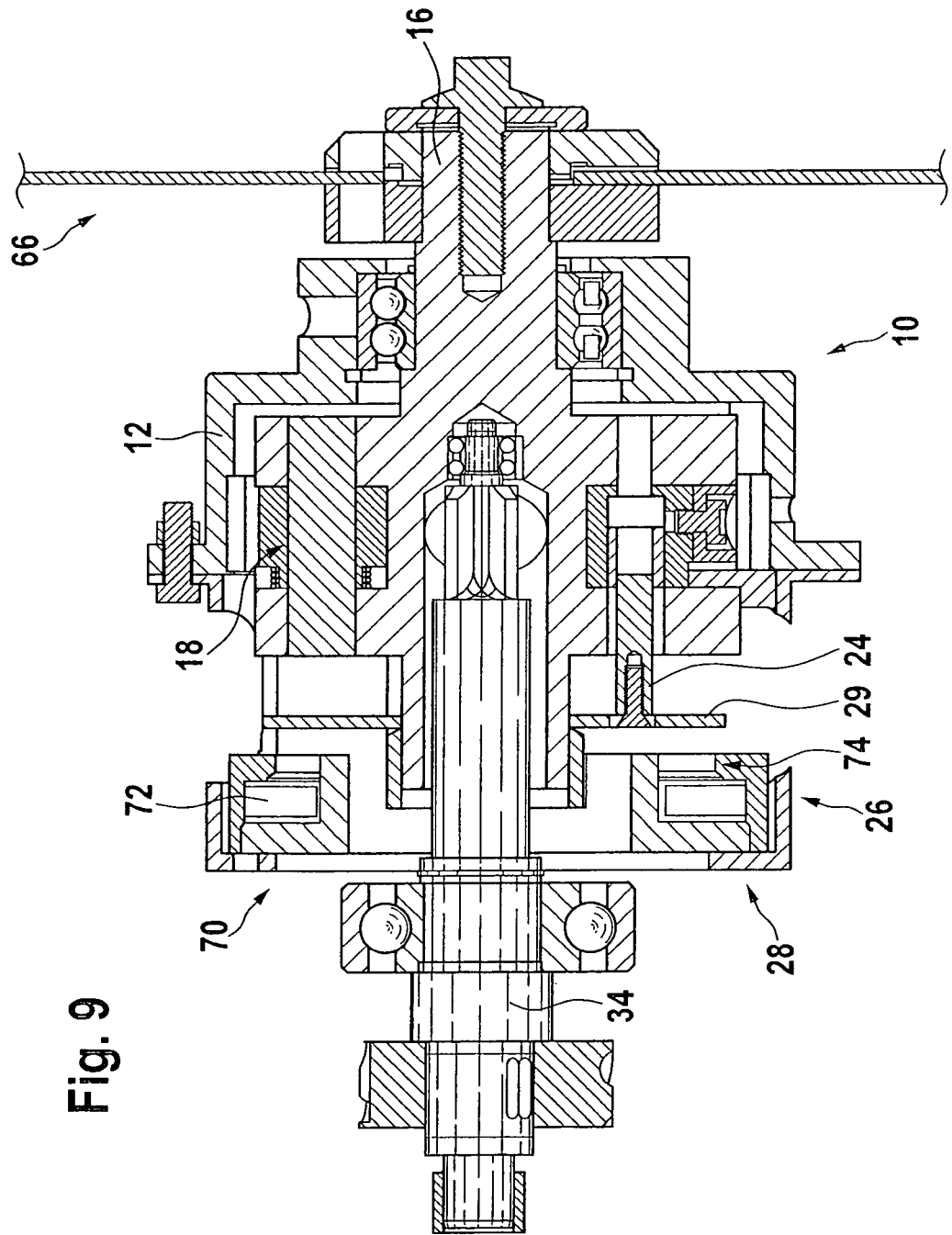
FIG. 9 shows a schematic illustration of the braking system according to the present invention having a locking device.
Figure 10:
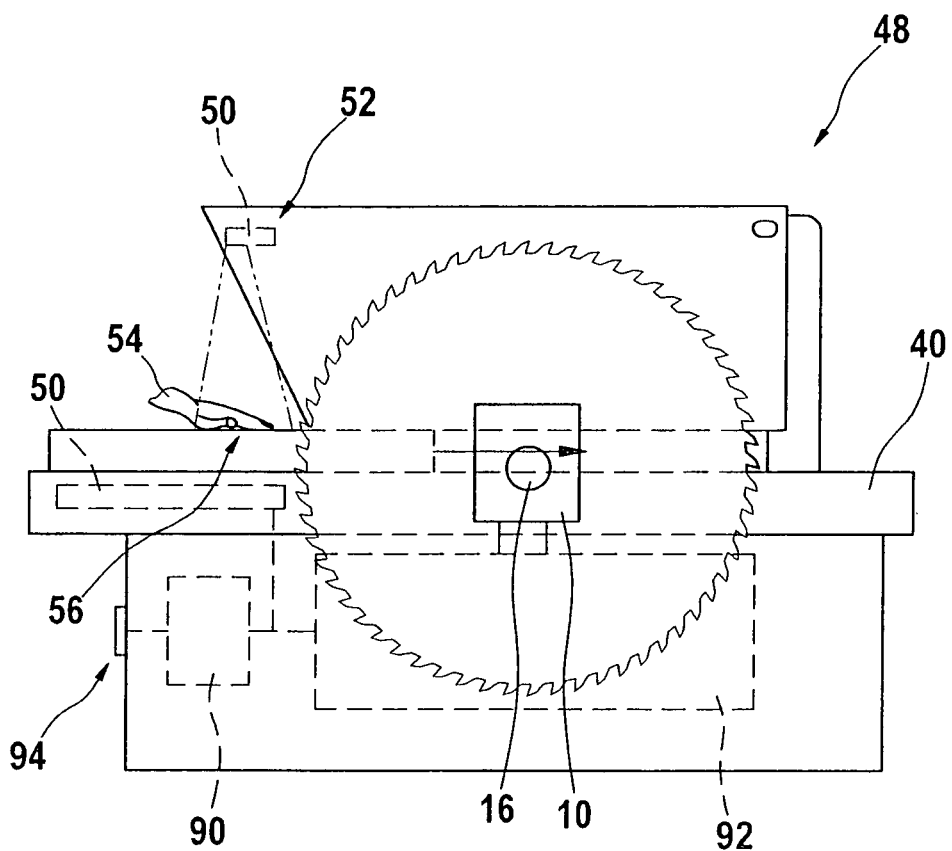
FIG. 10 shows one exemplary embodiment of a machine tool according to the present invention in the form of a circular table saw, in a side view.
Figure 11:
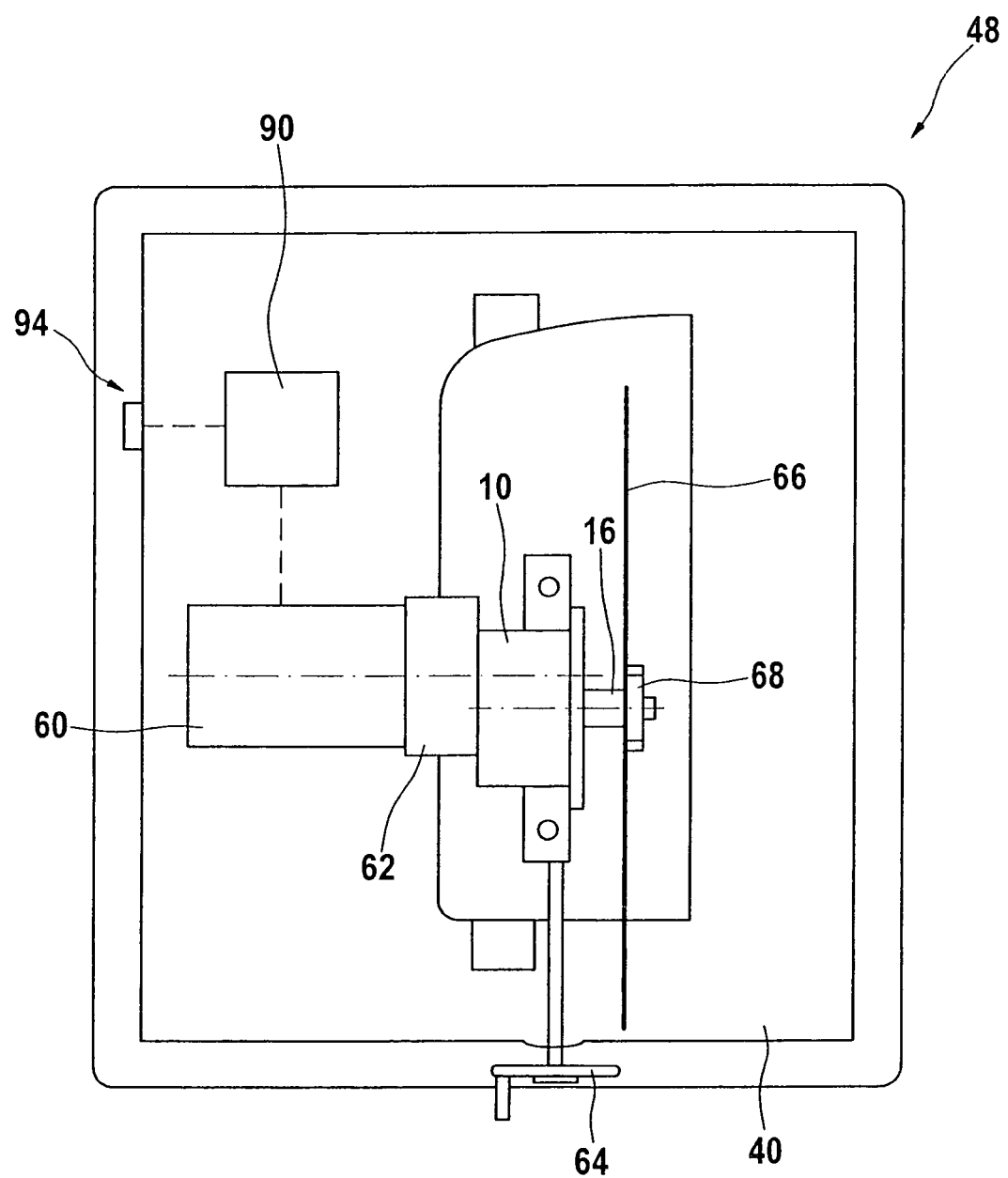
FIG. 11 shows one alternative exemplary embodiment of a machine tool according to the present invention in the form of a circular table saw, in a top view.

The design principle of the emergency braking system according to the present invention is explained with reference to FIGS. 1 through 6. FIGS. 7, 8, and 9 are used to describe details of the actuator for the locking device of the braking system according to the present invention, the diagnostic system, and the interaction of these two units. FIGS. 10 and 11 show a machine tool according to the present invention in the form of a circular table saw having an emergency braking system according to the present invention.

FIGS. 1 through 6 show schematic views of an emergency braking system according to one example embodiment of the present invention, which is denoted overall by reference numeral 10 and which is used, for example, to bring a saw blade of a circular table saw (not shown here; see FIG. 10) which is in a hazardous situation to a standstill within a very short time period in the range of a few milliseconds.

Emergency braking system 10 for a machine tool for abruptly braking a revolving shaft 16 according to FIGS. 1 through 6 includes at least one brake drum 12 and at least one brake shoe 18 which are engaged with one another to brake a shaft 16, the braking intervention between the brake drum 12 and the brake shoe 18 taking place under the influence of a centrifugal force resulting from the rotation of a shaft 16 when a locking device 26 is released. According to the present invention, a diagnostic system 90 is present which has diagnostic means 98, 102 which allow the functionality of locking device 26 to be checked.

Emergency braking system 10 includes a stationary brake drum 12 which is fastened to a frame component (not illustrated in greater detail) of a saw. This frame component must be designed in such a way that it withstands and is able to absorb braking torques generated during the deceleration phase. Emergency braking system 10 also includes a brake shoe carrier 14, which is fixedly connected to an output shaft 16 on the saw blade side in such a way that the brake shoe carrier revolves together with the output shaft in the rotational direction denoted by arrow 17. Two diametrically opposed brake shoes 18 are fastened to brake shoe carrier 14, each being rotatably supported about a swivel pin 20. Brake shoes 18 are each provided with a friction lining 22 on their surface facing brake drum 12, these friction linings 22 engaging with stationary brake drum 12 during a braking operation of emergency braking system 10, so that friction linings 22 and brake drum 12 form a friction pairing. In the state illustrated in FIG. 1 in which the braking operation has not yet been triggered, brake shoes 18 are fixedly held against brake shoe carrier 14 with the aid of locking pins 24 of a locking device 26, so that the brake shoes are not able to rotate about swivel pins 20.

These locking pins 24 are part of locking device 26, which also has a magnetic actuator 28 via which locking pins 24 may be moved between a locked position, in which brake shoes 18 are held against brake shoe carrier 14, and an unlocked position in which brake shoes 18 are released in such a way that they undergo a swivel motion about their swivel pins 20 in the direction of brake drum 12 in order to bring about the braking intervention between friction linings 22 and brake drum 12.

The system according to the present invention also has a diagnostic unit which checks the functionality of the emergency braking system, and in particular of the locking device. The diagnostic system checks in particular the functionality of the actuator for the emergency braking system, as well as the correct orientation and position of the locking device. The diagnostic system is described in greater detail with reference to FIGS. 7 through 11.

Figure 1:
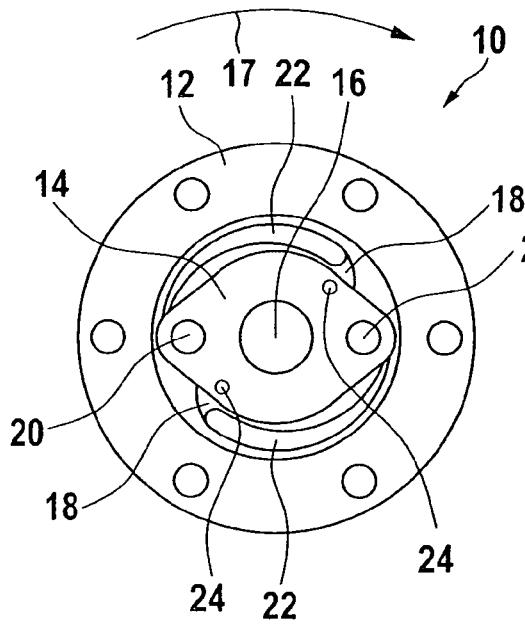
FIG. 1 shows a schematic front view of an emergency braking system according to one example embodiment of the present invention, in a state in which the braking operation has not been triggered.
Figure 2:
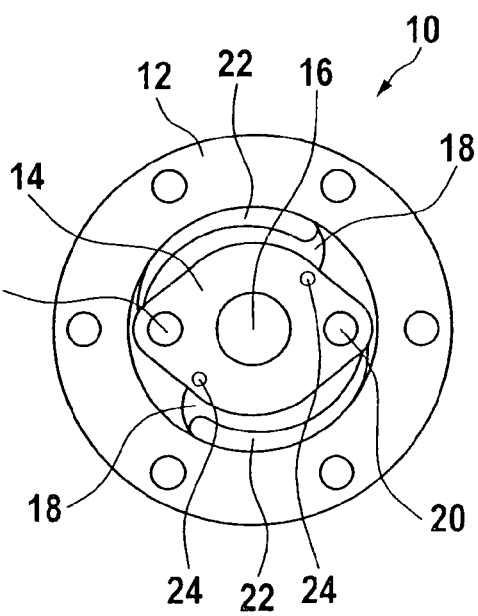
FIG. 2 shows a schematic, front view of the emergency braking system illustrated in FIG. 1, in a state in which the braking operation has been triggered.
Figure 3:
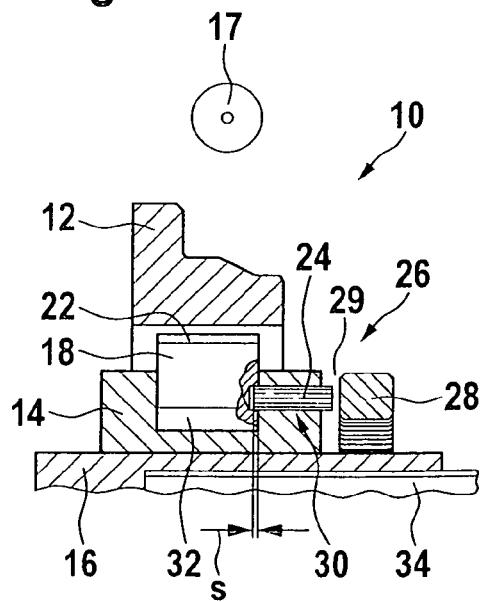
FIG. 3 shows a longitudinal sectional view of the emergency braking system illustrated in FIGS. 1 and 2, in a state in which the braking operation has not been triggered.

As shown in FIG. 3, magnetic actuator 28 of locking device 26 is fixedly attached to output shaft 16. Alternatively, magnetic actuator 28 may be fastened to a stationary housing part (not illustrated) and may act on locking pins 24 in a contactless manner. Locking pins 24, which may be moved back and forth by magnetic actuator 28, extend through openings 30 provided in brake shoe carrier 14, and in the state illustrated in FIGS. 1, 3, and 5, in which the braking operation has not yet been initiated, engage in engagement openings 32 provided in each of brake shoes 18. Brake shoes 18 are locked to brake shoe carrier 14 in this way.

Figure 4:
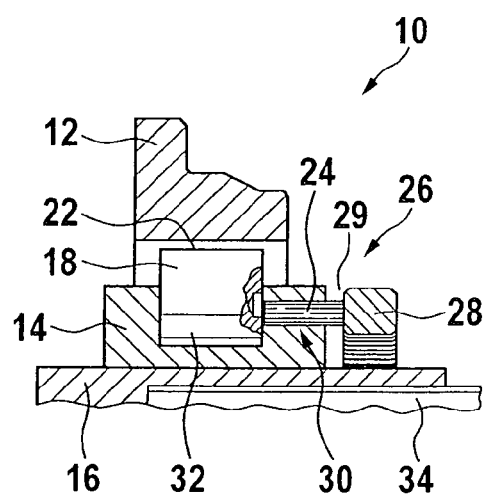
FIG. 4 shows a schematic longitudinal sectional view of the emergency braking system illustrated in FIGS. 1 through 3, in a state in which the braking operation has been triggered.
Figure 5:
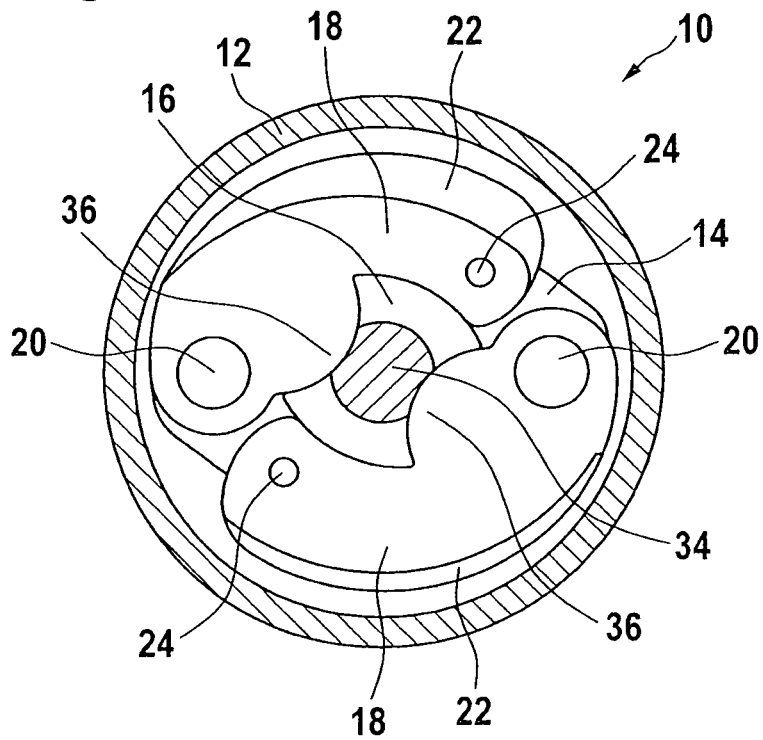
FIG. 5 shows a schematic cross-sectional view of the emergency braking system illustrated in FIGS. 1 through 4, in a state in which the braking operation has not been triggered.
Figure 6:
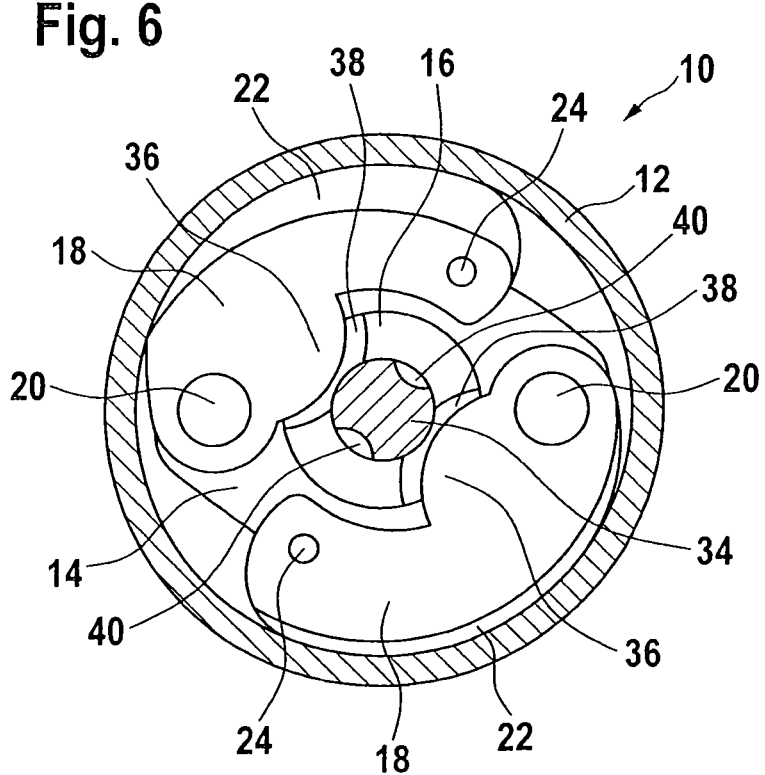
FIG. 6 shows a schematic cross-sectional view of the emergency braking system illustrated in FIG. 1 through 5, in a state in which the braking operation has been triggered.

When the braking system is triggered, magnetic actuator 28 pulls anchor plate 29, to which locking pins 24 are fastened, by a defined disengagement path s from brake shoe carrier 14, thus releasing brake shoes 18 (see FIGS. 4 and 9). The brake shoes rest against stationary brake drum 12 as a result of the centrifugal forces or the centrifugal acceleration generated by revolving output shaft 16, thus forming the friction pairing between friction linings 22 of brake shoes 18 and brake drum 12 which is necessary for decelerating output shaft 16. Even if locking pins 24 are moved back and forth with the aid of magnetic actuator 28 in the present exemplary embodiment, it is noted that locking pins 24 may alternatively be moved in one of the two directions of motion under the action of an elastic force 27 or the like. Thus, locking pins 24 may move forward under the influence of magnetic actuator 28, while locking pins 24 are reset by one or multiple spring elements 27, or vice versa (see FIG. 7, for example).

As illustrated in detail in particular in FIG. 8, magnetic actuator 28 which is actuated in the event of triggering is composed of a magnetic circuit 70, composed of a coil 72 and a magnetic return 74, which may be activated in the event of triggering. As illustrated in particular in FIGS. 3 and 8, anchor 29 is placed at a defined distance from actuator 28. This distance at the same time forms the size of projecting end $s_L$, of locking pins 24 in the braking system.

As the result of a magnetic force $F_{mag}$ this anchor 29 may be attracted by magnetic circuit 70, causing locking pins 24 of the braking system to undergo a similar motion. Braking system 10 is thus activated. Magnetic actuator 28 is always fixedly attached, for example to the housing, to allow force $F_{mag}$ to be supported.

FIG. 7 shows a detail of locking device 26 of the emergency braking system according to the present invention, together with diagnostic unit 90 which is designed to ensure the correct functionality of locking system 26. Locking device 26 is composed at least of actuator 28, which is an electromagnetic actuator, and locking pins 24. When the braking system is triggered, magnetic actuator 28 pulls anchor plate 29, to which locking pins 24 are fastened, from the brake shoe carrier of the brake unit by a defined disengagement path s, thus releasing the brake shoes.

However, this presumes that the magnetic actuator is reliably operating, and that the locking pins are in the correct position. The function of diagnostic system 90 is to check these prerequisites, and to prevent operation of the machine tool if the prerequisites are not present.

The functions for diagnosing the system state of the braking system may be carried out, for example, with the aid of an electronics system, specifically provided for this purpose, in a diagnostic circuit 96. Depending on the result of the diagnosis, the machine tool may then be enabled or also blocked, for example.

The state of magnetic actuator 28, which triggers the braking system of the machine tool with the aid of a given signal of a sensor system, may be checked, for example before the machine starts operation. Based on the signal response, the presence and the state of all relevant contacts of the system may be deduced.

If diagnostic system 90 recognizes that actuator 28 is functional, a start signal for enabling the motor operation may be output.

For diagnostic purposes, actuator 28 is acted on by a diagnostic current which is less than the current which is needed in the event of triggering. When actuator 28 is acted on by the diagnostic current, anchor 29 is not attracted; however, the state of actuator 28 and in particular the state of electromagnetic coil 72 may be deduced from measured characteristic data of diagnostic current 98 sent by the actuator, such as the current intensity, the voltage, or also the variation of these variables over time, for example.

With the aid of a diagnostic circuit 96 which is able to record and evaluate an analog variable in the range of a few milliseconds, even the signal variation over time, for example in the form of an increase in current, may be used to deduce the state of actuator 28, for example the winding 72 thereof, by comparing the obtained measured data to setpoint data stored in a storage medium 100 of diagnostic system 90.

For this purpose a characteristic curve, in particular a characteristic curve of diagnostic current 98 sent by actuator 28, may be advantageously measured and evaluated.

As a result of the design of the braking system and in particular of the locking device of the braking system, the position of anchor plate 29 is a direct indication of system states (locked or unlocked), and thus in particular of the position of locking pins 24, and is therefore to be evaluated as a key point of a system diagnosis.

With the aid of a specialized sensor 102, at any time in the system check, information concerning the position of this anchor plate 29 may be forwarded to system 90 and evaluated in order to deduce appropriate measures for the future operation of the equipment.

It is also possible to deduce the distance of anchor plate 29 from magnetic actuator 28 by determining and evaluating the magnetic field (diagnostic magnetic field) which develops in magnetic circuit 70 of actuator 28 during the diagnosis due to diagnostic current 98. This may optionally be achieved using auxiliary electric variables, in this case dispensing with additional sensor 102 for recognizing the position of anchor plate 29. The inductance of coil 72, which is also a function of the position of anchor plate 29, may be used as such an auxiliary variable. The position and in particular the distance of anchor plate 29 from attracting coil 72 of the actuator may be deduced by measuring the inductance of coil 72 with the aid of a diagnostic current 98 of diagnostic device 90. Since locking pins 24 of locking device 26 are provided at the anchor plate 29, it may thus be determined whether locking pins 24 are in their intended, defined position, and whether they may be correctly extracted in the event of triggering.

Diagnostic system 90, with the aid of diagnostic current 98, thus allows the functionality of actuator 28 as well as the correct orientation of locking pins 24 of locking system 26 to be checked.

The diagnostic functions of diagnostic system 90 may also be carried out at predefined intervals, for example once per minute, during operation of the equipment in order to obtain information concerning possible changes in the emergency braking system during regular operation of the machine. It is reasonable for diagnostic system 90 to be activated in particular also when the machine tool is switched on. First, a diagnosis of the emergency braking system of the device is then carried out, and depending on the result, diagnostic system 90 enables or does not enable the machine tool. In the event of enablement, for example, the motor of the machine tool may be activated. If the diagnostic system detects an irregularity, i.e., in particular a deviation of the measured parameters from the stored setpoint variables, the machine tool is not started, and a user is informed of the presence of a potential problem.

FIG. 8 illustrates a model section through the magnet, showing the design of a divided return. This variant is advantageous for allowing installation of magnetic circuit 60.

FIG. 9 shows the configuration of brake unit 10, including locking device 26, in an overview illustration.

Due to the critical time constraints of the referenced braking system it appears expedient, among other things, to select a concept which allows use of the technical principle of self-help. This means that tension force $F_{Sp}$ introduced for the triggering is multiply intensified within the system, and generated reaction force $F_{Reakt}$ in the present case in the form of a friction force $F_R$, in turn contributes to the increase in introduced tension force $F_{Sp}$. This characteristic is also referred to as "self-amplifying" or "servo effect." In principle, the systems thus characterized provide the smallest possible deceleration times under low tension forces, thus allowing the mass of the triggering elements as well as required triggering time $t_A$ to be minimized.

The amplifying factor is defined as follows:

$$C^* = \frac{F_R}{F_{Sp}} = \frac{\mu \cdot \tan\alpha}{\tan\alpha - \mu}$$

If factor $C^*$ is positive, the forces act in the direction assumed in the diagram. Friction force $F_R$ results from tension force $F_{Sp}$ which is amplified by factor $C^*$. For $\mu = \tan\alpha$, the equation for $C^*$ has a pole, so that this amplifying factor tends to infinity. The system state of a labile equilibrium essentially prevails at this point. The selection of parameters $\tan\alpha < \mu$ results in a negative amplifying factor $C^*$. This represents a theoretical reversal of the direction of tension force $F_{Sp}$, which would have to occur in order to maintain the force equilibrium. In reality, this case characterizes a special state of a self-amplifying system. Due to the resulting continuous mutual increase in the friction forces and normal forces, in the ideal case static friction occurs within the friction pairing after a short period of time. This results in blockage of the entire system. In this regard, this is generally referred to as "self-locking." Forces advantageously occur which are larger than the forces which are imparted by the centrifugal force on the brake shoes.

Thus, as a function of relative coefficient of friction $\mu$ of the friction partners, angles $\alpha$ result which denote areas in which self-amplifying or self-locking occurs. In this regard it could be advantageous to provide the friction lining of at least one of the friction or brake partners with an inhomogeneous design.

The time interval for the triggering time of the braking operation may be greatly shortened due to the previously described design of emergency braking system 10, since the braking intervention between brake drum 12 and brake shoes 18 takes place under the influence of the centrifugal force or centrifugal acceleration resulting from the rotation of output shaft 16. In addition, a self-amplifying and even a self-locking effect of the braking results, thus allowing the braking effect to be increased and the braking times to be advantageously shortened.

Due to the use of a two-sided action of the peripheral friction force on the friction pairing, the roller bearings used in the present case are spared, and need not be modified or even redesigned in the interest of durability of the overall system, which in turn would introduce increased mass inertia into the system.

As the result of a design as previously described, revolving external geometries of the brake unit are also avoided, thus allowing implementation of an easily encapsulated, closed system having a compact design which also integrates well into the special concerns of occupational safety in the use of machine tools.

It should be self-evident that magnetic actuator 28 is actuated by output signals of appropriate sensors, which detect a state in which an operator is approaching dangerously close to the saw blade of the circular table saw. Such sensors are known in the related art, and therefore are not described in greater detail in the present description.

FIGS. 10 and 11 show exemplary embodiments of a machine tool according to the present invention, having an emergency braking system 10 and a sensor system 52 for recognizing the presence of a type of material, in particular tissue such as the tissue of a human hand. Circular saw 48 illustrated in a side view in FIG. 10 is a circular table saw (bench top system), and has a recognition device 52 which is provided for recognizing the presence of a type of material 54, in particular tissue, for example, in a machine tool working range 56. Device 52 for the detection has at least one sensor 50 which may be installed in a plane above the working range of the machine tool, as indicated in FIG. 10. Alternatively, sensor 50 of device 52 may be integrated directly into work table 40. The two options may be implemented separately or together, as illustrated as an example in FIG. 10. However, device 52 for detecting in particular human tissue as well as other materials may include, but is not limited to, radar sensors, in particular ultra-wide band (UWB) radar sensors, and/or optical sensors, in particular near infrared (NIR) systems, for example.

For detecting, for example, a hand 54 in the hazard range directly in front of the saw blade of the machine tool, an activity signal is generated which releases securing pins 24 of brake shoes 18 so that, as described in detail above, the brake shoes are driven against brake drum 12 as the result of the centrifugal force, and initiate the braking operation.

The present invention is directed to monitoring at predetermined intervals, with the aid of a diagnostic system, the braking system prior to, switching on the machine tool as well as during operation of the machine tool, on the basis of specific criteria, and to deduce the system state thereof using stored characteristic data. Deducible measures may be carried out in the form of prohibiting the machine tool from being switched on, initiating emergency braking triggered by the system, fading in of messages on a display, or the like.

For this purpose, diagnostic unit 90 is advantageously situated between a control unit 92 of the machine tool and a power switch 94 for the machine tool.

After power switch 94 is actuated, the diagnostic routine is started in order to ensure that locking system 26 may be reliably released in an emergency. For this purpose, for example, the state of actuator 28 and the position of locking pins 24 of the brake shoes are measured as described above. If the data match the setpoint data stored in the system, control unit 92 of the saw is activated, and, for example, the motor of the saw is started and sensor system 52 for recognizing the presence of a type of material, in particular tissue such as the tissue of a human hand, is activated.

The present diagnostic unit is set up to monitor at predetermined intervals, which are as regular as possible, the braking system prior to switching on the machine tool as well as during operation of the machine tool, on the basis of specific criteria, and to deduce the system state thereof using stored characteristic data. Deducible measures may be carried out in the form of prohibiting the machine tool from being switched on, initiating emergency braking triggered by the system, fading in of messages on a display, or the like. If, for example, a deviation in the functionality of the actuator is detected, braking of the motor may be initiated and/or the system may be switched off (safety shutoff) without the emergency braking system being activated.

A user may then be requested, for example, to restart the machine tool. Upon restarting, the machine then executes the diagnostic program of diagnostic unit 90 once again, as described above, and thus confirms whether there are concerns regarding a possible malfunction of the emergency braking system of the machine tool, or whether the safety shutoff has occurred due to a faulty measurement.

FIG. 11 shows the exemplary embodiment of a circular table saw 48 in a top view. A motor 60 drives a tool via gearing 62, in the exemplary embodiment of FIG. 11 the tool being a saw blade 66. Saw blade 66 is fastened to an output shaft 16 via a clamping device 68. Emergency braking system 10 is advantageously situated between gearing 62 and shaft 16; i.e., in the event of activation allows shaft 16 to be decoupled from driving gearing 62. Overload of the gear stage in the event of emergency braking is thus avoided. It is then advisable for the gear stage and the drive shaft to be decoupled from one another.

A diagnostic unit 90 once again is provided, between motor 60 and a power switch for the system, and is situated beneath the level of the table and not visible in FIG. 11; before the motor is activated, the diagnostic unit checks whether the locking device could be reliably released in the event of braking.

Even if a circular table saw has been selected as an example of a machine tool in the previously described example embodiment, it should be self-evident that the principle of the present invention may also be applied to other machine tools.

What is claimed is:

1. An emergency braking system for abruptly braking a revolving shaft of a machine tool, comprising:
a locking device;
a diagnostic system configured to check the functionality of the locking device; and
at least one brake drum and at least one brake shoe engaged with one another and configured to brake the revolving shaft when the locking device is released;
wherein the locking device has at least one blocking element configured to be moved between a locked position and an unlocked position, wherein the blocking element is engaged with the at least one brake shoe in the locked position and decoupled from the brake shoe in the unlocked position;
wherein the locking device has an electromagnetic actuator configured to switch the locking device from the locked position to the unlocked position;
wherein the diagnostic system is configured to check at least one of (i) the functionality of the actuator and (ii) the functionality of a blocking element of the locking device;
wherein the diagnostic system provides a diagnostic current which acts on the actuator of the locking device; and
wherein the diagnostic current which acts on the actuator of the locking device is less than a current required to release the locking device.

2. The emergency braking system as recited in claim 1, wherein a magnetic field generated in the actuator due to the diagnostic current is measured and evaluated.

3. The emergency braking system as recited in claim 2, wherein the magnetic field is measured in a time-resolved manner.

4. An emergency braking system for abruptly braking a revolving shaft of a machine tool, comprising:
a locking device;
a diagnostic system configured to check the functionality of the locking device; and
at least one brake drum and at least one brake shoe engaged with one another and configured to brake the revolving shaft when the locking device is released;
wherein the locking device has at least one blocking element configured to be moved between a locked position and an unlocked position, wherein the blocking element is engaged with the at least one brake shoe in the locked position and decoupled from the brake shoe in the unlocked position;
wherein the locking device has an electromagnetic actuator configured to switch the locking device from the locked position to the unlocked position;
wherein the diagnostic system is configured to check at least one of (i) the functionality of the actuator and (ii) the functionality of a blocking element of the locking device;
wherein the diagnostic system provides a diagnostic current which acts on the actuator of the locking device; and
wherein the diagnostic system includes a memory storing reference characteristic data, and wherein a characteristic curve of the applied diagnostic current is measured by the diagnostic system and compared to the reference characteristic data stored in the memory of the diagnostic system for diagnostic purposes.

5. The emergency braking system as recited in claim 4, wherein a time-resolved characteristic curve of the applied diagnostic current is measured and compared to the reference characteristic data.

* * * * *